Sept. 3, 1946.        W. H. T. HOLDEN        2,406,836
                ELECTRIC AIR POSITION INDICATOR
            Filed March 24, 1944        4 Sheets-Sheet 1

INVENTOR
*W. H. T. HOLDEN*
BY
*P. C. Smith*
ATTORNEY

FIG. 5

Sept. 3, 1946.   W. H. T. HOLDEN   2,406,836
ELECTRIC AIR POSITION INDICATOR
Filed March 24, 1944.   4 Sheets-Sheet 4

INVENTOR
W. H. T. HOLDEN
BY
P. C. Smith
ATTORNEY

Patented Sept. 3, 1946

2,406,836

UNITED STATES PATENT OFFICE 2,406,836

ELECTRIC AIR POSITION INDICATOR

William H. T. Holden, Woodside, N. Y., assignor to Bell Telephone Laboratories, Incorporated, New York, N. Y., a corporation of New York Application March 24, 1944, Serial No. 527,998

5 Claims. (Cl. 235—61)

This invention relates to an air position indicator for use on an aircraft for enabling the pilot or the navigator to determine at any instant the latitude and longitude of his position and the air miles which he has flown from any specified take-off point. More particularly the invention is concerned with the provision of electrical equipment for controlling indicators which continuously indicate the aircraft position in degrees and minutes of latitude and longitude and the air miles which have been flown.

The utility of apparatus of this character is quite evident. On ships the problem of determining the ship's position at any instant is not great due to the slow speed at which surface ships sail and due to the fact that such ships always carry a navigator as a member of the crew who has ample time to make celestial observations, to do the navigational plotting that is necessitated from the data secured from such observations and to keep the necessary records of course and speed to enable a dead reckoning position to be always known. However, aircraft and particularly airplanes which have high cruising speeds present a more difficult problem for solving navigational data to determine positions. This is particularly true of airplanes of the high speed type which may not have space to accommodate a navigator as a part of the crew. Furthermore in aerial navigation under war conditions, evasive action involves such frequent changes of course and speed that a navigator cannot keep an accurate log from which the dead reckoning position may be obtained. The apparatus which is the subject of this invention may be described as an automatic dead reckoning device.

Apparatus has heretofore been proposed for producing indications of the position of an airplane and the air miles flown which may be observed by the pilot but such apparatus has been of a complicated mechanical construction, making its production slow and costly, and requiring extremely close limits of mechanical dimensions to produce an acceptable accuracy of results.

It is therefore an object of the present invention to provide apparatus electrically controlled in accordance with the air speed of an aircraft and with the true course of the flight to continuously indicate the latitude and longitude of the air position of the aircraft and the air miles which have been flown whereby substantially accurate indications are made possible.

It is a further object of the invention to provide air position indicating equipment which is sufficiently compact and of light enough weight that it may be readily installed in small airplanes.

To attain these objects apparatus has been designed in two parts, an indicator unit and a control unit. Most modern airplanes are equipped with an air mileage unit and with either a remote control earth inductor compass or a remote control magnetic compass unit. From these units information may be secured concerning the air speed and the compass course of the airplane flight for enabling a control unit to control the indicator unit. The indicator unit is provided with three indicators which may be of the counting wheel type, one of which is controlled to indicate the air miles flown, the second of which indicates the degrees and minutes of latitude of the instant position of the airplane, and the third of which indicates the degrees and minutes of longitude of the instant position of the airplane. The indicator may also be provided with a pointer and compass rose for indicating the true compass course of the flight. Provision is made for enabling the latitude and longitude indicators to be reset to indicate the latitude and longitude of the positions of the airplane at some known point as, for example, at the take-off of a flight and with means for enabling these indicators to be operated in one or the other direction dependent upon whether the flight is being conducted in the north or south hemisphere or east or west of a particular meridian.

As disclosed in one modification of the invention the motor-generator sets and gearing for driving the several indicators are enclosed in a casing which houses the indicators. Since this assemblage, while relatively compact, does not readily permit of its mounting in the usual instrument panel installed in front of the pilot, a simplified form of indicator unit the indicators of which may be operated by remote controls from motor-generator sets located in the control unit may be used and is disclosed in the modified form of the invention. This indicator unit is sufficiently compact so that it may be mounted in the instrument panel and occupy no greater area in such panel than do the other flight instruments such as the altimeter or remote indicating compass.

The control unit comprises the amplifier and relay apparatus necessary to control the motor and generator assemblies of the indicator unit, when installed therein or when installed in the control unit, in response to the operation of the air speed motor unit and the compass unit of the airplane.

For a clearer understanding of the invention and the mode of its operation reference may be had to the following detailed description thereof when read in connection with the accompanying drawings in which.

Figure 1:
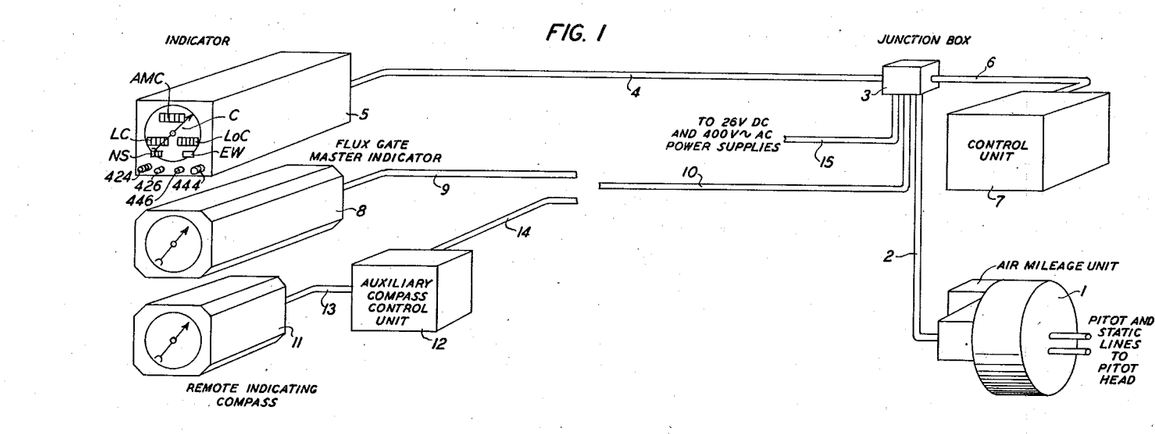
Fig. 1 shows schematically the assembly of the apparatus units involved in the present invention.
Figure 6:
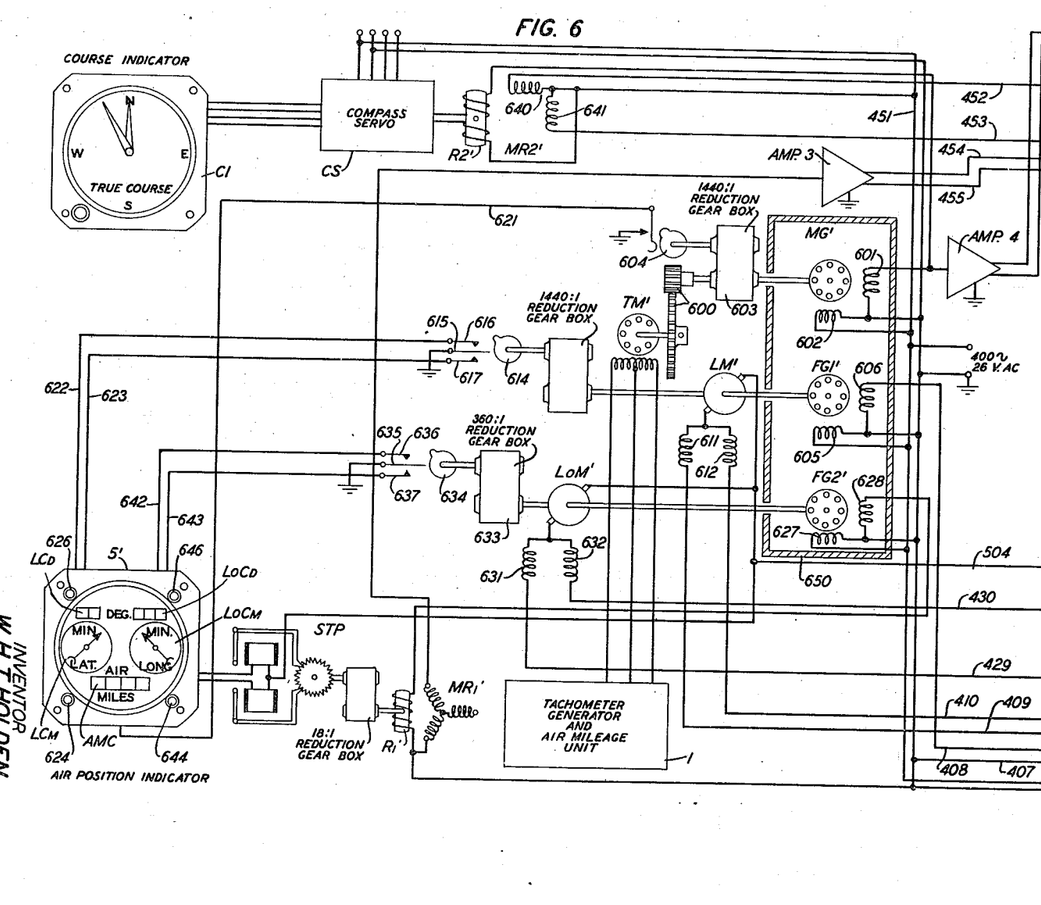
Fig. 6 shows the apparatus and circuits of an indicator unit constituting a modification of the invention and control equipment therefor which may be assembled as a part of the control unit disclosed in Fig. 5.

Referring first to Fig. 1 the several apparatus units required to carry forward the invention are schematically illustrated. The air mileage unit which constitutes a part of the apparatus of an airplane is shown at 1. This unit is equipped with a tachometer generator which is connected by the cable 2 through the junction box 3 and cable 4 to a tachometer motor which forms part of the motor-generator set of the indicator 5 for driving the air miles indicator, or, alternatively, from the junction box 3 through the cable 6 to the control unit 7 if this motor-generator set constitutes a part of the control unit as illustrated in the modified form of the invention disclosed in Fig. 6. If the airplane is equipped with a remote control earth inductor compass control unit 8 or so-called "flux gate" compass unit, such unit is connected by the cable 9 attached to the cable 10, through the junction box 3 to the unit 5 over cable 4. If the airplane is equipped with a remote indicating compass of the so-called "magnesyn" control type such as is indicated schematically at 11, this compass is associated with the auxiliary control unit 12 over cable 13 which latter unit is then connected by cable 14 attached to cable 10, through junction box 3 to the control unit 7 and to the indicator unit 5. If an indicator unit of the type disclosed in Fig. 6 is used then the compass control unit 8 would be connected with a remote control indicating compass on the instrument panel of the airplane. Power for operating the electrical equipment of the air position indicator is obtained over cable 15 extending from the 26-volt direct current source and the 400-cycle 26-volt alternating current supply source of the airplane.

The air speed motor unit 1 is driven by an air motor which is responsive to the difference of pressure between the pilot and the static tubes of the airplane and in turn drives a tachometer generator which, being driven at a speed commensurate with the air speed, generates a potential which varies linearly with the air speed and which potential is utilized to drive a tachometer motor forming a part of the motor-generator set associated with the air miles indicator AMC.

Figure 4:
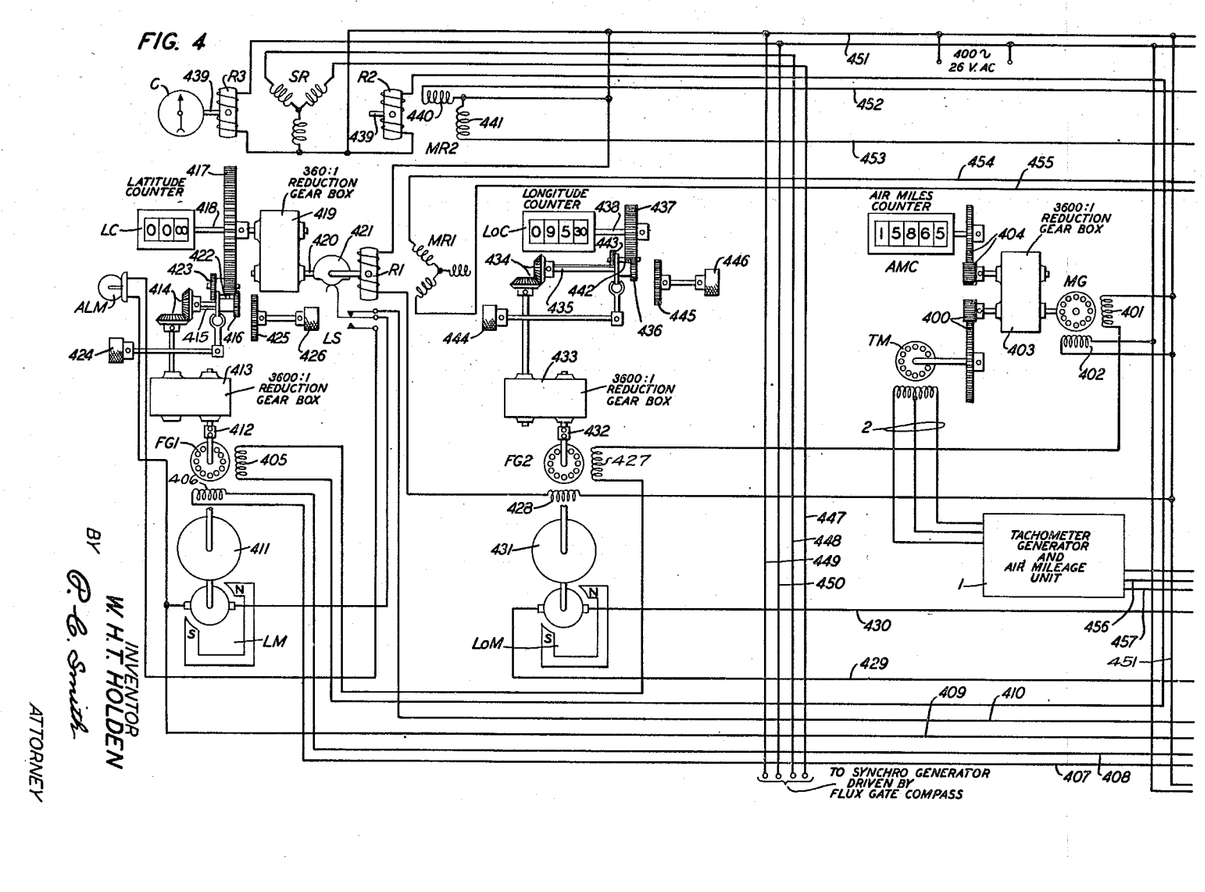
Fig. 4 shows the apparatus and circuits of the indicator unit constituting one modification of the invention.

The indicator 5 if of the type disclosed in Fig. 4 comprises a housing containing three motor-generator sets each coupled by a suitable gear train to an indicator which may be of the multiple counting wheel type the wheels of which may be viewed through a sight opening in the face of the housing. One of these counters AMC indicates the air miles or total distance flown relative to the air. A second one of the counters LC indicates the latitude and a third of the counters LoC indicates the longitude relative to the air (neglecting wind) of the flight position of the airplane after these counters have been set at the latitude and longitude of some known point, for example the take-off point of the flight.

Figures 2, 3:
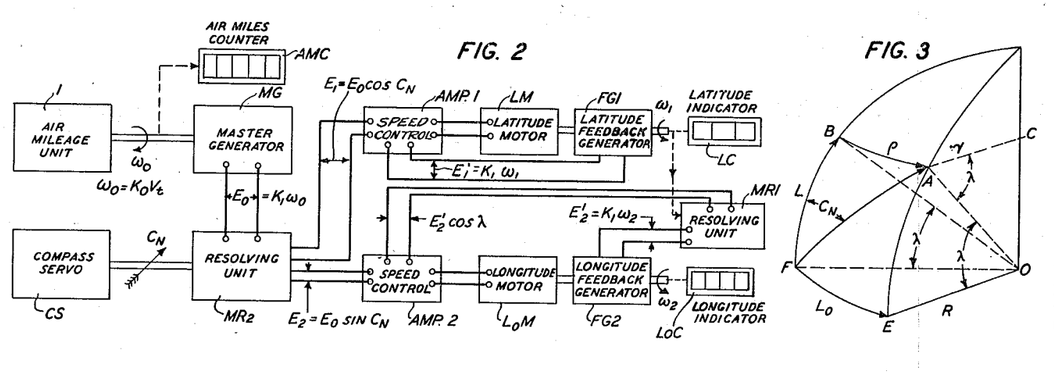
Fig. 2 is a circuit diagram showing schematically the assembly of the apparatus units.
Fig. 3 is a vector diagram explanatory of the theoretical aspects of the invention.
Figure 5:
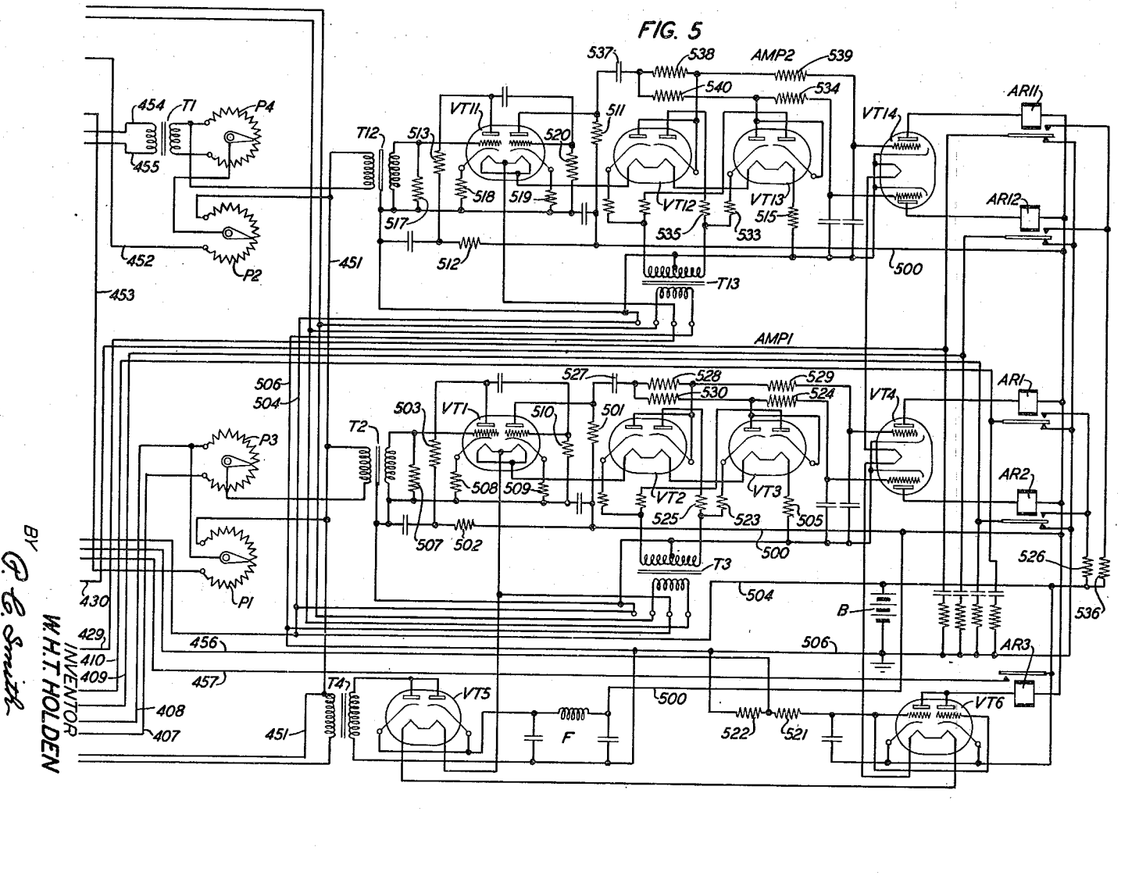
Fig. 5 shows the apparatus and circuits of the control unit which may be used with either modification of the invention.

The circuit diagram of Fig. 2 shows schematically the manner in which apparatus embodying the modification of the invention disclosed in Figs. 4 and 5 or apparatus embodying the modification of the invention disclosed in Figs. 5 and 6 is interconnected electrically. In this diagram the air mileage unit 1 is disclosed as mechanically or otherwise coupled to the master generator MG and either mechanically or electrically coupled as desired with the air miles counter AMC. If the rotational velocity of the input to the master generator is assumed to be $\omega_0$ then this rotational velocity may be expressed in terms of air speed as $K_0V_t$. The master generator has an output potential $E_0$ which at the angular speed $\omega_0$ may be expressed as $K_1\omega_0$. This output potential is impressed upon the input of the resolving unit MR2 which is oriented by the compass servo CS through the true course angle $C_N$ whereupon output potentials $E_1$ and $E_2$ are derived, the potential $E_1$ having a value equal to $E_0 \cos C_N$ and potential $E_2$ having a value equal to $E_0 \sin C_N$.

The potential $E_1$ is applied to the input of the speed control device AMP1 whose output controls the latitude motor LM to drive the latitude feedback generator FG1 at an angular speed $\omega_1$ corresponding to the angular speed $\omega_0$ as modified by the resolving unit MR2. The shaft of the motor LM may drive the latitude indicator LC either mechanically or electrically as desired. The feedback generator FG1 generates a potential $E'_1$ which is equal to $K_1\omega_1$ which potential is applied as a feedback potential upon the input of the speed control device AMP1.

The potential $E_2$ is applied to the input of the speed control device AMP2 whose output controls the longitude motor LoM to drive the longitude feedback generator FG2 at an angular speed $\omega_2$. The rotor shaft of motor LoM may drive the longitude indicator LoC either mechanically or electrically as desired. The feedback generator FG2 generates a potential $E'_2$ equal to $K_1\omega_2$ which is impressed upon the input of the resolving unit MR1 which is oriented from the input shaft of the latitude counter LC either mechanically or electrically as desired through the latitude angle $\lambda$ whereupon an output potential having a value $E'_2 \cos \lambda$ is derived and impressed as a feedback potential upon the input circuit of the speed control device AMP2.

For a more detailed disclosure of the invention reference will first be made to Figs. 4 and 5 which disclose one embodiment thereof.

As previously stated the air mileage unit 1, whose motor speed is 24 revolutions per minute per knot of true air speed and whose maximum speed corresponding to 450 knots would be 10,800 revolutions per minute, is geared down by a reduction gearing having a ratio of 6 to 1 to drive a tachometer generator at a speed of 1800 revolutions per minute whereby the tachometer motor TM, electrically associated with the air mileage unit 1 over the cable 2, is also driven at a speed of 1800 revolutions per minute. In the indicator 5 the motor TM through the gearing 400 having a speed-up ratio of 1 to 4 drives the master generator MG at four times the speed of the motor TM or, for example, at 7200 revolutions per minute when the motor TM is operating at a speed of 1800 revolutions per minute.

The master generator MG is a two-phase, 400-cycle induction motor functioning as an induction generator. A potential whose amplitude is proportional to the rotational speed and whose phase is substantially constant up to a speed of 6000 revolutions per minute appears across the control phase 401 of this generator. This potential has the same frequency as the 400-cycle, 26-volt supply AC of alternating current which is connected to its fixed phase winding 402. The generator may be considered as a transformer whose ratio is dependent on the rotational speed. The motor TM, through the gearing 400, the reduction gear box 403 having a reduction ratio of 3600 to 1, and through the further gearing 404 having a reduction ratio of 24 to 9 drives the air miles counter AMC. The input wheel of this counter, graduated 0 to 9, moves continuously making one revolution for each ten nautical miles. The other wheels are advanced by decimal Geneva movements in the usual manner to register the tens, hundreds, thousands and ten thousands of miles. Since 7200 revolutions per minute of the shaft of generator MG corresponds to 450 knots or 7.5 nautical miles per minute, the input shaft should rotate at 0.75 revolution per minute and the total reduction gear ratio between the generator shaft and the counter should be 9600 to 1. This is accomplished by the gear box 403 and the gears 404.

The latitude counter LC is driven by a second motor-generator set comprising a miniature direct current motor LM of the magneto type, the rotor of which is directly coupled with the rotor of the feedback generator FG1. This feedback generator is a two-phase 400-cycle induction motor functioning as a generator and has one of its phase windings 405 connected in series with the phase winding 401 of the master generator MG and its other phase winding 406 connected over conductors 407 and 408 with the winding of potentiometer P3 associated with the input side of the amplifier circuit AMP1 of Fig. 5. The feed back generator FG1 is identical with the master generator MG and serves to hold the speed of motor LM, the armature circuit of which is connected over conductors 409 and 410 with the output side of amplifier circuit AMP1, to a value such that the output of the feedback generator FG1 is equal to the output of the master generator as modified by the magnetic resolver MR2. A flywheel 411 is mounted on the rotor shaft of motor LM between the rotor of the motor and the rotor of the generator FG1 to delay speed changes.

The rotor shaft of motor LM is also connected through a flexible coupling 412 to the input shaft of the reduction gear box 413, the flexible coupling reducing the rotational shock to the reduction gear box. The output shaft of the gear box 413 is connected through bevel gears 414 having a unity ratio, with a shaft 415 upon which the pinion 416 is slidable. This pinion in the position disclosed meshes with gear 417 which is mounted on the driving shaft 418 of the latitude counter LC. When the master generator MG is rotating at a speed of 7200 revolutions per minute or 450 knots on a true course north corresponding to 7.5 minutes of latitude per minute of time, the shaft 418 of counter LC should make one revolution for each sixty minutes of latitude. Therefore the gear reduction required is 7200 revolutions per minute to .125 revolution per minute or 57,600 to 1. This is secured by the reduction gear box 413 which has a reduction ratio of 3600 to 1 followed by the gears 416 and 417 which introduce a further reduction ratio of 16 to 1. The input wheel of counter LC, graduated 0 to 59 minutes, moves continuously making one revolution for each degree of latitude. The other wheels are advanced by decimal Geneva movements in the usual manner to register the units and tens of the degrees of latitude.

The shaft 418 of the counter is also connected to the input shaft of the reduction gear box 419 the output shaft 420 of which is connected to the rotor R1 of the magnetic resolver MR1. The gear box 419 has a reduction gear ratio of 360 to 1 so that a complete revolution of the rotor R1 would result should the countershaft 418 rotate 360 revolutions to cause the counter LC to indicate 360 degrees. The latitude counter LC, however, reads only from 00 degrees 00 minutes to 99 degrees 59 minutes and readings beyond 75 degrees 30 minutes north or 75 degrees 30 minutes south are not used. Therefore the limit switch LS is provided, which is operated by cam 421 mounted on shaft 420, to open the circuit of motor LM and to close the circuit of alarm lamp ALM in the event the rotor R1 should be rotated more than 75 degrees 30 minutes either side of the position in which the counter LC indicates 00 degrees 00 minutes.

When a flight is being conducted in the northern hemisphere the driving gear 416 is meshed with the gear 417 as disclosed and the counter LC will increase its reading as the flight proceeds northward and will decrease its reading if the flight proceeds southward towards the equator. When the equator is crossed a reading of 00 degrees 00 minutes would be followed by a reading of 99 degrees 59 minutes as the flight proceeds into the southern hemisphere. In order, therefore, that the counter may increase its reading through 00 degrees 01 minute, etc., means is provided whereby the navigator or pilot may reverse the rotation of the counter as the flight crosses the equator. This means comprises a pair of connected gears 422 and 423 of the same pitch diameter as the driving gear 416, mounted on an idler shaft and so positioned that the gear 422 is normally in mesh with gear 417 and that the gear 423 may be meshed with gear 416. To reverse the direction of rotation of the countershaft 418 the driving gear 416 is moved along the driving shaft 415 by the control knob 424 out of mesh with gear 417 and into mesh with the reversing gear 423. At the same time a shutter NS (see Fig. 1) in the face of the indicator unit 5 changes from N to S. In place of the reversing gears a switch could be employed for controlling the electrical reversal of the motor LM.

The control knob 424 has three positions, the right position being for northward flight, the left position being for southward flight and the intermediate position being such that the driving gear 416 is entirely out of mesh with either the gear 417 or the reversing gear 423. In this position the reset gear 425 may be meshed with gear 417 by the operation of the reset knob 426 to permit the setting of the counter LC as at a definite fix or landmark the latitude of which is known.

The longitude counter LoC is driven by a third motor-generator set comprising a miniature direct current motor LoM of the magneto type, the rotor of which is directly coupled with the rotor of the feedback generator FG2. This feedback generator is a two-phase 400-cycle induction motor functioning as a generator and has one of its phase windings 427 connected in series with the phase winding 401 of the master generator MG and its other phase winding 428 connected in series with the winding of rotor R1 of the magnetic resolver MR1. The feedback generator FG2 is identical with the master generator MG and serves to hold the speed of motor LoM, the armature circuit of which is connected over conductors 429 and 430 with the output side of amplifier circuit AMP2 of Fig. 5, to a value such that the output of the feedback generator is equal to the output of the master generator as modified by the magnetic resolver MR1. A flywheel 431 is mounted on the rotor shaft of motor LoM between the rotor of the motor and the rotor of the generator FG2 to delay speed changes.

The rotor shaft of motor LoM is also connected through a flexible coupling 432 to the input shaft of the reduction gear box 433, the flexible coupling reducing the rotational shock to the reduction gear box. The output shaft of the gear box is connected through bevel gears 434 having a unity ratio with a shaft 435 upon which the pinion 436 is slidable. This pinion in the position disclosed meshes with gear 437 which is mounted on the driving shaft 438 of the longitude counter LoC. When the master generator MG is rotating at a speed of 7200 revolutions per minute or 450 knots on a true course corresponding to 7.5 minutes of longitude per minute of time, the shaft 438 of counter LoC should revolve four times as fast as the shaft 418 of the latitude counter LC since the rate of change of longitude may be four times as great as the rate of change of latitude. Therefore the gear reduction required is 7200 revolutions per minute to .500 revolution per minute or 14,400. This is secured by the reduction gear box 433 which has a reduction ratio of 3600 to 1 followed by the gears 436 and 437 which introduce a further reduction ratio of 4 to 1. The input wheel of counter LoC, graduated 0 to 59 minutes, moves continuously making one revolution for each degree of longitude. The other wheels are advanced by decimal Geneva movements in the usual manner to register the units, tens and hundreds of the degrees of longitude.

When a flight is being conducted in the eastern hemisphere the driving gear 436 is meshed with the gear 437 as disclosed and the counter LoC will increase its reading as the flight proceeds eastward and will decrease its reading if the flight proceeds westwardly. This counter may read 000 degrees 00 minutes to 999 degrees 59 minutes but the maximum useful range is, of course, 000 degrees 00 minutes to 180 degrees 00 minutes east or west. When the reference meridian is crossed a reading 000 degrees 00 minutes would be followed by 999 degrees 59 minutes as the flight proceeds into the western hemisphere. In order therefore that the counter may increase its reading through 000 degrees 01 minute, etc., means is provided whereby the navigator or pilot may reverse the rotation of the counter as the flight crosses the reference meridian. This means is similar to that associated with the latitude counter and comprises the reversing gears 442 and 443 and the knob 444. It is assumed that the right position of knob 444 is disclosed as that in which driving gear 436 is in mesh with gear 437 for driving the counter for a flight in the eastern hemisphere, that the mid-position of the knob is the position in which gear 436 is out of mesh with both gears 437 and 443 and in which position the reset knob 446 may be operated to mesh gear 445 with gear 437 to permit the setting of the counter LoC as at a definite fix or landmark the longitude of which is known, and that the left position of knob 444 is that in which driving gear 436 is in mesh with reversing gear 443 for driving the counter in the direction for a flight in the western hemisphere. A shutter EW located in the face of the indicator unit 5 (see Fig. 1) changes from E to W when the knob 444 is moved to the left. In place of the reversing gears a switch could be employed for controlling the electrical reversal of the motor LoM.

Also located in the indicator unit 5 is a synchro-receiver SR having a Y-type stator the three windings of which are connected over conductors 447, 448 and 449 with the similar windings of the stator of a synchro-transmitter (not shown) but driven by the remote control earth inductor compass unit 8. The rotor R3 of the synchro-receiver is mounted on the shaft 439 which moves the compass needle of the compass C and which also moves the rotor R2 of the magnetic resolver MR2. The winding of the rotor R3 is connected over conductors 449 and 450 with the rotor winding of the synchro-transmitter driven by the unit 8 and with the source AC of 400 cycles alternating current.

If the airplane is equipped with a remote control magnetic compass of the so-called "magnesyn" type as disclosed at 11 in Fig. 1 driven from the auxiliary compass control unit 12, then the synchro-receiver SR would also be of the "magnesyn" type.

The horizontal stator winding 440 of the magnetic resolver MR2 is connected in series with the winding of potentiometer P2 over conductors 451 and 452 and the vertical stator winding 441 is connected in series with the winding of potentiometer P1 over conductors 451 and 453. The winding of rotor R2 of this magnetic resolver is connected in series with the winding 401 of the master generator MG so that a potential E0 is applied across the winding of the rotor which varies with the air speed of the flight and, since the rotor winding is oriented in accordance with the true compass bearing angle $C_N$ of the flight, a potential is derived from the horizontal winding 440 of this resolver which has a value $E_0 \sin C_N$ and a potential is derived from the vertical winding 441 which has a value $E_0 \cos C_N$.

The magnetic resolver MR1 previously referred to, the rotor R1 of which is driven from the shaft 418 of the latitude counter LC, has its rotor winding energized by potential impressed thereon from the stator winding 428 of the feedback generator FG2 and has two windings of its Y-connected stator connected by conductors 454 and 455 with the primary winding of transformer T1, the secondary winding of which transformer is bridged across the winding of potentiometer P4.

Potentials impressed upon the windings of potentiometers P1 and P3 are added and impressed upon the primary winding of input transformer T2 of amplifier circuit AMP1 over a circuit which may be traced from the lower terminal of the primary winding of transformer T2, over the brush and the upper portion of the winding of potentiometer P3, over the brush and upper portion of the winding of potentiometer P1 to the upper terminal of the primary winding of transformer T2. Similarly the potentials impressed upon the windings of potentiometers P2 and P3 are added and impressed upon the primary winding of input transformer T12 of amplifier circuit AMP2 over a circuit which may be traced from the lower terminal of the primary winding of transformer T12 over the brush and upper portion of the winding of potentiometer P4 and over the brush and upper portion of the winding of potentiometer P2 to the upper terminal of the primary winding of transformer T12. The potentiometers P1 to P4 may be of the screwdriver adjustable type to secure suitable adjustments of the feedback and signal potentials and to take up any variations in the ratio of the transformers T2 and T12 to the generators FG1 and FG2. The amplifiers AMP1 and AMP2 may be of the type disclosed in the application of R. W. Ketchledge, Serial No. 473,083, filed January 21, 1943.

The potential impressed upon the primary winding of the input transformer T2 of amplifier circuit AMP1 is amplified by the dual amplifier tube VT1 and under the control of the dual diode tubes VT2 and VT3 serving as full wave rectifiers the output from tube VT1 is applied to the grids of the dual triode tube VT4 to operate one or the other of the relays AR1 or AR2 which control the application of direct current from the source B to the rotor circuit of the direct current motor LM. The potential impressed upon the primary winding of input transformer T12 of the amplifier AMP2 is amplified by the dual amplifier tube VT11 and under the control of the dual diode tubes VT12 and VT13 serving as full wave rectifiers the output from tube VT11 is applied to the grids of the dual triode tube VT14 to operate one or the other of the relays AR11 or AR12 which control the application of direct current from the source B to the rotor circuit of the direct current motor LoM.

Potential from the source AC of 26-volt 400-cycle is stepped up to 250 volts by the transformer T4, is rectified by the dual diode tube VT5 and the rectified current is filtered by the filter circuit F and applied as a 250-volt direct current potential to the anode bus-bar 500. From this bus-bar anode potential is applied through the windings of relays AR1 and AR2 to the anodes of tube VT4, through the windings of relays AR11 and AR12 to the anodes of tube VT14, through resistance 501 and resistances 502 and 503 in series to the anodes of tube VT1 and through resistance 511 and resistances 512 and 513 in series to the anodes of tube VT11. Filament heating current is supplied from the direct current source B, over the 26-volt bus-bar 504 through resistance 505 and the filaments of tubes VT3, VT2 and VT1 in series to the ground bus-bar 506, from bus-bar 504 through resistance 515 and the filaments of tube VT13, VT12 and VT11 in series to the ground bus-bar 506 and from the bus-bar 504 through the filaments of tubes VT14, VT4, VT6 and VT5 in series to the ground bus-bar 506. Potential from the battery bus-bar 504 is also applied through the grid biasing resistances 507 and 517 in parallel with the secondary windings of input transformers T2 and T12 to the input grids of tubes VT1 and VT11, respectively, from bus-bar 504 through resistances 508, 509, 518 and 519 to the cathodes of tubes VT1 and VT11 and from bus-bar 504 through resistances 510 and 520 to the right grids of tubes VT1 and VT11.

Potential from the 26-volt, 400-cycle source AC is also supplied to the primary winding of stepup transformer T3 which steps up the potential to 200 volts. The mid-point of the secondary winding of switching control transformer T3 is connected to the battery bus-bar 504, one end terminal is connected through resistances to the cathode of the left unit of the rectifier tube VT2 and to the anode of the right unit of rectifier tube VT3 and the other end terminal is connected through resistances to the anode of the right unit of rectifier tube VT2 and to the cathode of the left unit of rectifier tube VT3. A potential of 200 volts is similarly applied through the switching control transformer T13 to the cathodes and anodes of tubes VT12 and VT13.

Relays AR1, AR2, AR11 and AR12 are preferably of the high speed, glass sealed, mercury contact reed type disclosed in the application of C. E. Pollard, Serial No. 487,999, filed May 22, 1943.

In case the output power from the air mileage unit 1 is not sufficient to drive the tachometer generator which in turn drives the tachometer motor TM, output power from the unit 1 may be applied over conductor 456 through resistance 521 to the control grid of the dual rectifier tube VT6 which in response to the signal amplifies such signal to operate the anode relay AR3 which in turn applies power from the battery bus-bar 504 over conductor 457 to the unit 1 to drive the motor therein which in turn drives a tachometer generator to furnish the power for driving the tachometer motor TM. Anode potential is supplied to the tube VT6 from the 250-volt bus-bar 500 through the winding of anode relay AR3, cathode potential is supplied from the battery bus-bar 504 and grid potential is supplied from the ground bus-bar 506 through resistance 522.

In order that the air position indicator may be made sufficiently compact to be mounted in an instrument mounting space on the usual instrument panel of an airplane, an indicator of the type disclosed at 5' in Fig. 6 is provided. This indicator includes two two-directional stepping devices of the type STP shown schematically to the right of the indicator and a single directional stepping device. One of the two-directional stepping devices is capable of advancing the pointer of the latitude minutes indicator L$Cm$ in either direction of rotation and to rotate the input shaft of the latitude degrees counter L$Cd$ one revolution for each degree of latitude. The other wheel of this counter is advanced by a decimal Geneva movement in the usual manner. The other of the two-directional stepping devices is capable of advancing the pointer of the longitude indicator Lo$CM$ in either direction of rotation and to rotate the input shaft of the longitude degrees counter Lo$Cd$ one revolution for each degree of longitude. The other wheels of this counter are advanced by decimal Geneva movements in the usual manner. The single directional stepping device drives the input shaft of the air miles counter AMC the input wheel of which makes one revolution for each ten nautical miles and the other wheels of which are advanced by decimal Geneva movements in the usual manner.

The indicator is provided with a reset knob 626 for resetting the latitude counter and a reset knob 646 for resetting the longitude counter to indicate the latitude and longitude of a point the latitude and longitude of which are known. A switch-button 624 is also provided for reversing the connection of the control conductors 622 and 623 to the windings of the stepping device which controls the latitude minutes indicator LCm and the latitude degrees counter LCd so that they may be operated in the reverse direction when a flight is being conducted in the southern hemisphere and a similar button 644 is provided for reversing the connection of the control conductors 642 and 643 to the windings of the stepping device which controls the longitude minutes indicator LoCm and the longitude degrees counter LoCd.

Three motor-generator sets for controlling the air position indicator are provided, these sets corresponding in general to the similar sets disclosed in Fig. 4. They, however, are installed in an assembly separated from the indicator. The motor-generator assembly for operating the air miles counter AMC of the indicator comprises a motor TM' which, through the gearing 600 having a speed-up ratio of 1 to 4, drives the master generator MG' at four times the speed of the motor TM' or, for example, at 7200 revolutions per minute when the motor TM' is operating at a speed of 1800 revolutions per minute. The master generator MG' is a two-phase, 400-cycle induction motor functioning as an induction generator. A potential whose amplitude is proportional to the rotational speed appears across the control phase 601 of this generator and has the same frequency as the 400-cycle, 26-volt supply AC of alternating current which is connected to its fixed phase winding 602. The generator may be considered as a transformer, whose ratio is dependent on the rotational speed. The motor TM' through the gearing 600 and the reduction gear box 603 having a reduction gear ratio of 1440 to 1, rotates the cam 604 which once per revolution establishes a circuit over conductor 621 and through the winding of the stepping magnet (not shown) which advances the input shaft of the air miles counter AMC.

The motor-generator set for controlling the stepping device associated with the latitude minutes indicator LCm and latitude degrees counter LCd comprises a split field series-connected direct current motor LM' coupled directly with the rotor of the feedback generator FG1'. This feedback generator is a two-phase, 400-cycle induction motor functioning as a generator and has one of its phase windings 605 connected to the source AC of 400-cycle current and its other phase winding 606 connected over conductors 407 and 408 with the winding of the potentiometer P3 associated with the input side of the amplifier unit AMP1 of Fig. 5. One brush of the motor LM' is connected over battery bus-bar 504 to the positive terminal of battery B and the other brush of the motor is connected through the two field windings 611 and 612, respectively, and over conductors 409 and 410 with the armatures of relays AR1 and AR2 located in the output side of the amplifier circuit AMP1 of Fig. 5. In this connection it is to be noted that when the amplifier circuits of Fig. 5 are used with the modified form of apparatus disclosed in Fig. 6, the front contacts of relays AR1, AR2, AR11 and AR12 are connected to ground and the back contacts are left unconnected.

The rotor shaft of motor LM' is also connected to the input shaft of the reduction gear box 613 on the output shaft of which cam 614 is mounted. The gear box 613 has a reduction ratio of 1440 to 1. The cam 614 is arranged to engage spring 615 with the upper contact 616 associated therewith once during each revolution of the output shaft of the gear box 613 when the output shaft is rotated by the motor LM' in one direction, for example, when a flight is being conducted northerly in the northern hemisphere and to engage the spring 615 with the lower contact 617 associated therewith once during each revolution of the output shaft of the gear box 613 when the output shaft is rotated by the motor LM' in the opposite direction, for example, when a flight is being conducted southerly in the northern hemisphere. The engagement of spring 615 with contact 616 completes a circuit over conductor 622 for one stepping magnet of the stepping device (not shown) which controls the latitude minutes indicator LCm and the latitude degrees counter LCd, and the engagement of spring 615 with contact 617 completes a circuit over conductor 623 for the other stepping magnet of such stepping device.

The motor-generator set for controlling the stepping device associated with the longitude minutes indicator LoCm and the longitude degrees counter LoCd comprises a split field series-connected direct current motor LoM' coupled directly with the rotor of the feedback generator FG2'. This feedback generator is a two-phase, 400-cycle induction motor functioning as a generator and has one of its phase windings 627 connected to the source AC of 400-cycle current and its other phase winding 628 connected across the winding of rotor R1' of the magnetic resolver MR1'. One brush of motor LoM' is connected over battery bus-bar 504 to the positive terminal of battery B and the other brush of the motor is connected through the two field windings 631 and 632, respectively and over conductors 429 and 430 with the armatures of relays AR11 and AR12 located in the output side of the amplifier circuit AMP2 of Fig. 5. The rotor shaft of motor LoM' is also connected to the input shaft of the reduction gear box 633 which has a reduction gear ration of 360 to 1 and on whose output shaft the cam 634 is mounted. Cam 634 is arranged to engage the spring 635 with the upper contact 636 associated therewith once during each revolution of the output shaft of the gear box 633 when the output shaft is rotated by the motor LoM' in one direction, for example, when a flight is being conducted easterly of a reference meridian and to engage the spring 635 with the lower contact 637 associated therewith once during each revolution of the output shaft of gear box 633 when the output shaft is rotated by the motor LoM' in the opposite direction, for example when a flight is being conducted westerly in the eastern hemisphere. The engagement of spring 635 with contact 636 completes a circuit over conductor 642 for one stepping magnet of the stepping device (not shown) which controls the longitude minutes indicator LoCm and the longitude degrees counter LoCd and the engagement of spring 635 with contact 637 completes a circuit over conductor 643 for the other stepping magnet of such stepping device.

The master generator MG' and the two feedback generators FG1' and FG2' are enclosed in a common housing 650 which closely embraces them whereby they are all similarly subjected to the same magnetic influences.

Since a synchro-receiver such as is shown at SR in Fig. 4 may not have sufficient torque to operate a magnetic resolver, such as MR2 also shown in Fig. 4, a compass servo device indicated by the box CS in Fig. 6, may be provided which may in the well-known manner be controlled by a synchro-transformer coupled with a synchro-generator driven by either a magnetic or earth inductor type compass control. The compass servo in turn drives the synchro-transmitter which is coupled with the synchro-receiver associated with the course indicator CI. This course indicator is mounted on the instrument panel of the airplane. The compass servo also rotates the rotor R2' of the magnetic resolver MR2'.

The horizontal stator winding 640 of the magnetic resolver MR2' is connected in series with the winding of potentiometer P2 in Fig. 6 over conductors 451 and 452 and the vertical stator winding 641 is connected in series with the winding of potentiometer P1 over conductors 451 and 453. The winding of the rotor R2' of this magnetic resolver is connected in series with the winding 601 of the master generator MG' so that a potential $E_0$ is applied across the winding of the rotor which varies with the air speed of the flight and since the rotor winding is oriented by the compass servo CS in accordance with the true compass bearing angle $C_N$ of the flight, a potential is derived from the horizontal winding 640 of this resolver which has a value of $E_0 \sin C_N$ and a potential is derived from the vertical winding 641 which has a value $E_0 \cos C_N$.

The magnetic resolver MR1', previously referred to, has a rotor R1' which is rotated by the two-directional stepper STP under the control of contacts operated by a cam (not shown) on the input shaft of the latitude degrees counter LCd of the air position indicator 5'. The winding of this rotor is energized by potential impressed thereon from the stator winding 628 of the feedback generator FG2'. Two windings of its Y-connected stator are connected across the input of the amplifier AMP3 which in the well-known manner serves to amplify the output potential of the magnetic resolver MR1' and to apply such amplified potential across the primary winding of transformer T1 of Fig. 5, the secondary winding of which transformer is bridged across the winding of potentiometer P4.

The output potential from the stator winding 601 of the master generator MG' is also impressed across the input side of amplifier AMP4 which in the well-known manner serves to amplify this potential and to apply such amplified potential across the primary windings of transformers T3 and T13 of Fig. 5.

The apparatus employed in embodying the invention having now been described, the manner in which the apparatus functions and particularly the apparatus disclosed in Figs. 4 and 5 will first be described. It will be assumed that the airplane in which the air position indicator is installed starts a flight from a position of 00 degrees 00 minutes latitude and 095 degrees 30 minutes longitude in the eastern hemisphere and that the flight is to proceed in the eastern and northern hemispheres. The pilot knows the latitude and longitude of the position of take-off and therefore sets the latitude and longitude counters LC and LoC by the operation of the reset knobs 426 and 446 in the manner previously described so that they indicate this position as disclosed in Fig. 4. He also sets the knobs 424 and 444 so that the counters will be operated in the proper direction for the contemplated flight, the position in which the knobs are set appearing as N and E on the shutters as viewed through the openings in the face of the indicator unit 5. It will also be assumed that previous to the contemplated flight the airplane has been flown 15,865 nautical air miles as indicated by the air miles counter AMC.

It will be assumed that a flight is made in the direction indicated by the line FA in Fig. 3 with a true compass course of $C_N$ degrees and at such a true air speed that the distance traversed at the time an observation is to be made, may be indicated by the vector FA. The latitude distance component FB of the vector FA is therefore FA $\cos C_N$ and the distance BA or $\rho$ along the latitude parallel through the point A is therefore FA $\sin C_N$. The air speed is measured by the air mileage unit 1 which operates the tachometer motor TM to drive the master generator MG at an angular velocity $\omega_0$ commensurate with the air speed or $\omega_0 = K_0 V_t$ where the true airspeed is expressed as $V_t$. As the flight progresses from the point of take-off F along the vector direction FA, the air miles counter AMC is driven through the reduction gear box 403 and the reduction gears 404 to add the nautical air miles which the airplane flies to the record on the counter at the point of take-off. The pilot noting the reading of the counter at any time and by subtracting therefrom the initial reading may ascertain the number of air miles flown.

If desired the counter AMC could be provided with a means for disconnecting the counter from its connection with the reduction gear box 403 and with means for resetting the counter to zero, similar to the means associated with the latitude counter LC, so that the air miles flown on any flight could be ascertained directly from the counter without the necessity of making a calculation.

The generator MG in operating generates a potential in the circuit extending through the vertical stator winding 401, the vertical stator windings of feedback generators FG1 and FG2 and the winding of rotor R2 of the magnetic resolver MR2 which is a measure of the air speed. Since the rotor R2 of the magnetic resolver is angularly positioned by the synchro-receiver SR in response to the true compass bearing of the flight as determined by the flux gate compass unit 8 or the auxiliary compass control unit 12, the rotor winding will assume a position with respect to the stator windings of the magnetic resolver commensurate with the true course angle $C_N$ (no compensation being made for the effect of wind). Since the potential impressed upon the rotor winding is in accordance with the air speed $V_t$ of the flight in the vector direction FA, which may be expressed $K_1\omega_0 = E_0$, the potential derived from the stator winding 441, which may be identified as $E_1$, may be expressed as $E_1 = E_0 \cos C_N$ and the potential derived from the stator winding 440, which may be identified as $E_2$, may be expressed as $E_2 = E_0 \sin C_N$. If now the vector FA of Fig. 3 be considered the distance vector of the flight it may be expressed as having a potential $E_0 t$. Then the distance vector FB of the flight position A will be $FB = L = E_1 t = E_0 t \cos C_N$ or $L = E_0 t \cos C_N$ and the vector BA or $\rho$ of the flight position A will be $\rho = E_2 t = E_0 t \sin C_N$.

The potential from the stator winding 440, having the value $E_1$ or $E_0 \cos C_N$, is impressed across the winding of potentiometer P1 and a potential derived therefrom is impressed through the transformer T2 upon the input circuit of amplifier tube VT1, is amplified by such tube and is impressed through condenser 527 and thence through resistances 528 and 529 in series to the upper grid of tube VT4 and in a parallel path through resistances 530 and 524 to the lower grid of tube VT4. The output of tube VT1 is shunted by two bridge circuits. The dual diode tube VT2 together with the two halves of the secondary winding of transformer T3 form one bridge and the dual diode tube VT3 and the two halves of the secondary winding of transformer T3 form the other bridge. The impedances of these bridges are controlled by the 400-cycle current of a reference phase obtained through the winding of transformer T3 from the source AC.

The impedance of the first bridge is connected between the junction of resistances 528 and 529 and the mid-point of the secondary winding of transformer T3 which is connected through the filament battery B to ground. The impedance of the second bridge is connected between the junction of resistances 530 and 524 and the mid-point of the secondary winding of transformer T3 and the potential drops due to the incoming signal current in these impedances are applied to the upper and lower grids respectively of tube VT4.

Due to the poling of the diodes VT2 and VT3 of the bridges, the bridges are conducting on alternate half cycles of the reference frequency. During the non-conducting half cycles the signal potential drop in either bridge is very small compared with the value during the conducting half cycles. When the first bridge is conducting the signal on the upper grid of tube VT4 will be either positive or negative depending on whether the signal is in phase or phase opposition to the reference frequency. In other words the grid receives either the positive or the negative pulses of the signal depending on the phase of the signal with respect to the reference frequency. Similarly, when the second bridge is conducting, that is, during the alternate half cycles of the reference frequency, the lower grid of tube VT4 receives either the negative or the positive signal pulses according to the phase of the signal.

If it be assumed that the incoming signal and the reference frequency are so phased that the lower unit of tube VT4 becomes conducting relay AR2 operates in a circuit from battery on the busbar 500 through the winding of relay AR2, over the anode-cathode path through the lower unit of tube VT4, to the positive side of the filament battery and thence to the ground bus-bar 506. Relay AR2 upon operating establishes a circuit for the motor LM which may be traced from battery B through resistance 526, over the front contact of relay AR2, conductor 409, through the rotor circuit of motor LM, over the normal contacts of limit switch LS, conductor 410, and over the back contact of relay AR1 to the ground terminal of battery B. Motor LM is thus operated to drive the feed back generator FG1.

The motor LM will quickly pick up speed until the generator FG1 is running at such a speed that the potential output from its stator winding 406 $E'_1 = K_1 \omega_1$ applied across the winding of potentiometer P3 balances the signal potential $E_1$ or $E_0 \cos C_N$ applied from the vertical stator winding 441 of the magnetic resolver MR2 across the winding of potentiometer P1, at which time the amplifier AMP1 will receive no signal potential and relay AR2 will cease operating to open the circuit of motor LM. The motor will then tend to slow down whereupon the generator FG1 will apply a feedback potential across the winding of potentiometer P3, lower than the signal potential whereupon the amplifier AMP1 will again function to operate relay AR2 to again establish the circuit of the motor LM. The motor LM will again bring generator FG1 up to a speed at which the feedback potential applied across the winding of potentiometer P3 again balances the signal potential $E_0 \cos C_N$. In this manner the motor attains a substantially constant speed at which the feedback generator FG1 has an output potential, herein designated $E'_1$, which equals the potential $E_0 \cos C_N$. Since the motor LM drives the latitude counter LC as previously described, the counter will be advanced at such a speed $\omega_1$ that after the time $t$ required for the airplane to fly from the point F to the point A or a latitude distance $E_1 t$ or $E_0 t \cos C_N$, it will indicate in degrees and minutes the latitude distance L of the position A of the airplane.

It is a well-known rule of geography that the change in longitude equivalent to a given departure varies in accordance with the secant of the average latitude. The basis for this assertion will be apparent from the following discussion considered in connection with the diagram of Fig. 3. It will be assumed that the longitude of point A with respect to point F is to be determined. BA and FE are similar arcs of two circles and are proportional to the radii of the circles. Therefore, if BA be designated $\rho$ and FE be designated $L_o$ or the longitude of the point A, then $$\frac{BA}{FE} = \frac{\rho}{L_o} = \frac{r}{R} \text{ or } \rho = \frac{rL_o}{R} \quad (1)$$

Now the latitude of the point A is the angle BOF which is equal to the angle AOE, but angle AOE is equal to the angle OAC of the right angle triangle OAC. If now the angle OAC be designated $\lambda$ we have in the triangle OAC $$AC = AO \cos \lambda \text{ or } \cos \lambda = \frac{AC}{AO} = \frac{r}{R} \quad (2)$$

Substituting Equation 2 in Equation 1 we have $$\rho = L_o \cos \lambda \text{ or } L_o = \frac{\rho}{\cos \lambda} \text{ or } L_o = \rho \sec \lambda \quad (3)$$

$\lambda$ is the latitude angle so it follows that $$L_o = \frac{\rho}{\cos L} \text{ or } L_o = \rho \sec L$$

In the circuits under discussion the value of $\rho$ in terms of potential is determined by the potential derived from the horizontal stator winding of the magnetic resolver MR2 and has a value assumed to be $E_2$ or $E_0 \sin C_N$ and therefore the potential value of $\rho$ may be expressed $E_0 \sin C_N$. The potential value of the latitude L has already been determined as $E'_1$ or $E_0 \cos C_N$ where $E'_1$ is the output potential of the feedback generator FG1 when such generator is operating at a speed $\omega_1$ such as to satisfy the latitude vector L. As a consequence the rotor R1 has been positioned through the latitude angle $\lambda$. Therefore in terms of potential and considering the output potential of the feedback generator FG2 to be $E'_2$ when such generator is operating at a speed such as to satisfy the longitude vector $L_o$, Equation 3 may be written in terms of potential as $$E'_2 t = t \left[ \frac{E_0 \sin C_N}{\cos \lambda} \right] \text{ or } E'_2 \cos \lambda = E_0 \sin C_N \quad (4)$$

Referring now to Figs. 4 and 5, potential from the stator winding 440 having the value $E_2$ or $E_0 \sin C_N$ is impressed across the winding of potentiometer P2 and a potential derived therefrom is impressed through the transformer T12 upon the input side of amplifier tube VT11, is amplified by such tube and is impressed through condenser 537 and thence through resistances 538 and 539 in series upon the upper grid of tube VT14 and in a parallel path through resistances 540 and 534 upon the lower grid of tube VT14. It will be assumed that the incoming signal potential for a flight toward the east is in phase with the potential impressed upon the left portion of the secondary winding of transformer T13 but out of phase with the potential impressed upon the right portion of the secondary winding of such transformer.

The output of tube VT11 is shunted by two bridge circuits, the dual diode tube VT12 together with the two halves of the secondary winding of transformer T13 form one bridge and the dual diode tube VT13 and the two halves of the secondary winding of transformer T13 form the other bridge. The impedances of these bridges are controlled by the 400-cycle current of a reference phase obtained through the windings of transformer T13 from the source AC.

The impedance of the first bridge is connected between the junction of resistances 538 and 539 and the mid-point of the secondary winding of transformer T13 which is connected through the filament battery B to ground. The impedance of the second bridge is connected between the junction of resistances 540 and 534 and the mid-point of the secondary winding of transformer T13 and the potential drops due to the incoming signal currents in these impedances are applied to the upper and lower grids, respectively, of tube VT14.

Due to the poling of the diodes VT12 and VT13 of the bridges, the bridges are conducting on alternate half cycles of the reference frequency. During the non-conducting half cycles the signal potential drop in either bridge is very small compared with the value during the conducting half cycles. When the first bridge is conducting the signal on the upper grid of tube VT14 will be either positive or negative depending on whether the signal is in phase or in phase opposition to the reference frequency. In other words the grid receives either the positive or the negative pulses of the signal depending on the phase of the signal with respect to the reference frequency. Similarly, when the second bridge is conducting, that is, during the alternate half cycles of the reference frequency, the lower grid of tube VT14 receives either the negative or the positive signal impulses according to the phase of the signal.

If it be assumed that the incoming signal and the reference frequency are so phased that the lower unit of tube VT14 becomes conducting, relay AR12 operates in a circuit from battery over the bus-bar 500, through the winding of relay AR12, over the anode-cathode path through the lower unit of tube VT14, to the positive side of the filament battery and thence to the ground bus-bar 505. Relay AR12 upon operating establishes a circuit for the motor LoM which may be traced from battery B through resistance 536 over the front contact of relay AR12, conductor 430, through the rotor circuit of motor LoM, over conductor 429 and the back contact of relay AR11 to the ground terminal of battery B. Motor LoM is thus operated to drive the feedback generator FG2.

The motor LoM quickly picks up speed whereupon the generator FG2 develops an output potential $E'_2$ in its stator winding 428 proportional to the air speed potential $E_0$ and applies such potential $E'_2$ across the rotor winding of the magnetic resolver MR1. It will be recalled that the rotor R1 of this magnetic resolver is rotated in response to the operation of the latitude motor LM. The angle through which the rotor R1 is turned is then equal to the angle subtended by the arc of latitude as appears by reference to Fig. 3 in which the angle of latitude is designated as $\lambda$. Consequently, a potential is derived from the stator windings of the magnetic resolver MR1 which has a value $E'_2 \cos \lambda$. This potential is then impressed from the stator windings of magnetic resolver MR1, over conductors 454 and 455 upon the primary winding of transformer T1, the secondary winding of which transformer is connected in series with the winding of potentiometer P4. Thus a potential equal to $E'_2 \cos \lambda$ is impressed upon the winding of potentiometer P4 which is opposite in phase to the potential equal to $E_0 \sin C_N$ impressed upon the winding of potentiometer P2. These potentials tend to balance each other and when the feedback generator FG2 reaches a speed such that its output potential $E'_2$ is of such a value that $E'_2 \cos \lambda = E_0 \sin C_N$ then the amplifier circuit AMP2 receives no input potential and relay AR12 releases to open the circuit of motor LoM.

Motor LoM will then tend to slow down whereupon the generator FG2 will apply a feedback potential across the winding of potentiometer P4 lower than the signal potential $E_0 \sin C_N$ whereupon the amplifier AMP2 will again function to operate relay AR12 to again establish the circuit of motor LoM. The motor LoM will again bring the generator FG2 up to a speed at which the feedback potential applied across the winding of potentiometer P4 again balances the signal potential $E_0 \sin C_N$. In this manner the motor attains a substantially constant speed at which the feedback potential $E'_2 \cos \lambda$ is generated.

Since the motor LoM also drives the longitude counter LoC as previously described, the counter will be advanced at such a speed that after the time $t$ required for the airplane to fly from the point F to the point A or a longitude distance $$t\left[\frac{E_0 \sin C_N}{\cos \lambda}\right]$$

or the longitude distance $L_0$, it will indicate in degrees and minutes the longitude of the position A of the airplane.

The modified form of air position indicator disclosed in Figs. 5 and 6 functions in substantially the same manner as the indicator just described. The chief difference between the two indicators is that the air miles, latitude and longitude counters of the air position indicator disclosed in Fig. 6 are remotely controlled from the motor-generator sets by stepping impulses transmitted to the indicator whereby it becomes possible to locate the indicator on the instrument panel and to locate the motor-generator sets in any convenient place in the airplane. While in the form of the invention disclosed in Fig. 6 split field series-connected direct current generators have been indicated it will be evident that magneto type generators such as are disclosed in Fig. 4 could be used.

It is also to be noted that the horizontal stator windings 605 and 627 of the feedback generators FG1' and FG2' are energized from the 400-cycle source AC rather than from the potential derived from the stator windings of the master generator as disclosed in Fig. 4. In this modification, however, a potential generated by the master generator MG', which varies in accordance with the air speed is made effective to determine that the feedback generators FG1' and FG2' shall generate the same potential as the master generator when they run at the same speed as the master generator by the application of the output potential from the master generator, through the amplifier AMP4, to the speed control amplifier circuits AMP1 and AMP2 through the windings of the switching control transformers T3 and T13.

What is claimed is:

1. In an air position indicator for an aircraft, an indicator for indicating the instant number of air miles flown, an indicator for indicating the instant latitude position of said aircraft, an indicator for indicating the instant longitude position of said aircraft, means for operating said first indicator in accordance with the air speed of the aircraft, means for generating a potential commensurate with the air speed of said aircraft, means controlled in accordance with the true compass course of the flight for deriving values of said potential which vary in accordance with the sine and cosine of the course angle, means controlled by said cosine potential for operating said latitude indicator, means controlled by said latter means for generating a potential which varies in accordance with the cosine of the latitude angle, and means controlled jointly by said latter potential and by said sine potential for operating said longitude indicator.

2. In an air position indicator for an aircraft, an indicator for indicating the instant number of air miles flown, an indicator for indicating the instant latitude position of said aircraft, an indicator for indicating the instant longitude position of said aircraft, means for operating said first indicator in accordance with the air speed of said aircraft, means for generating a potential commensurate with the air speed of said aircraft, means controlled in accordance with the true compass course of the flight for resolving said potential into potentials which vary with the sine and cosine of the true compass angle, a motor for driving said latitude indicator, a feedback generator driven thereby, a speed control device responsive to the output potential of said generator and to the cosine component of said air speed potential for causing said motor to drive said latitude indicator to continuously indicate the latitude position of said aircraft, a motor for driving said longitude indicator, a feedback generator driven by said latter motor, means operable by said first motor for deriving a potential from the output potential of said second generator which varies in accordance with the cosine of the angle of latitude, and a speed control device responsive to said derived potential and to the sine component of said air speed potential for causing said latter motor to drive said longitude indicator to continuously indicate the longitude position of said aircraft.

3. In an air position indicator for an aircraft, an indicator for indicating the instant number of air miles flown, an indicator for indicating the instant latitude position of said aircraft, an indicator for indicating the instant longitude position of said aircraft, means for operating said first indicator in accordance with the air speed of said aircraft, means for generating a potential commensurate with the air speed of said aircraft, means operative in accordance with the true flight course of the flight for deriving values of said potential which vary in accordance with the sine and cosine of the course angle, means controlled by said cosine potential for operating said latitude indicator, a magnetic resolver having a rotatable rotor winding rotatable by said latter means for deriving a potential which varies in accordance with the cosine of the latitude angle, and means controlled jointly by said latter potential and by said sine potential for operating said longitude indicator.

4. In an air position indicator for an aircraft, an indicator for indicating the instant number of air miles flown, and indicator for indicating the instant longitude position of said aircraft, an indicator for indicating the instant longitude position of said aircraft, means for operating said first indicator in accordance with the air speed of said aircraft, means for generating a potential commensurate with the air speed of said aircraft, means controlled in accordance with the true compass course of the flight for resolving said potential into potentials which vary with the sine and cosine of the true course angle, a motor for driving said latitude indicator, a feedback generator driven thereby, a speed control device responsive to the output potential of said generator and to the cosine component of said air speed potential for causing said motor to drive said latitude indicator to continuously indicate the latitude position of said aircraft, a motor for driving said longitude indicator, a feedback generator driven by said latter motor, a magnetic resolver having a rotor winding energizable by the output potential from said latter generator and rotatable by said first motor for deriving a potential from the output potential of said latter generator which varies in accordance with the cosine of the latitude angle, and a second speed control device responsive to said latter potential and to the sine component of said air speed potential for causing said latter motor to drive said longitude indicator to continuously indicate the longitude position of said aircraft.

5. In an air position indicator for an aircraft, an indicator for indicating the instant number of air miles flown, an indicator for indicating the instant latitude position of said aircraft, an indicator for indicating the instant longitude position of said aircraft, means for operating said first indicator in accordance with the air speed of said aircraft, means for generating a potential commensurate with the air speed of said aircraft, means controlled in accordance with the true compass course of the flight for resolving said potential into potentials which vary with the sine and cosine of the true course angle, a motor for driving said latitude indicator, a feedback generator driven thereby, a thermionic speed control circuit responsive to the feedback potential of said generator and to the cosine component of said air speed potential for causing said motor to drive said latitude indicator to continuously indicate the latitude position of said aircraft, a motor for driving said longitude indicator, a feedback generator driven by said latter motor, means operative by said first motor for deriving a potential from the output potential of said second generator which varies in accordance with the angle of latitude, and a second thermionic speed control circuit responsive to said derived potential and to the sine component of said air speed potential for causing said latter motor to drive said longitude indicator to continuously indicate the longitude position of said aircraft.

WILLIAM H. T. HOLDEN.